United States Patent Office 2,854,405
Patented Sept. 30, 1958

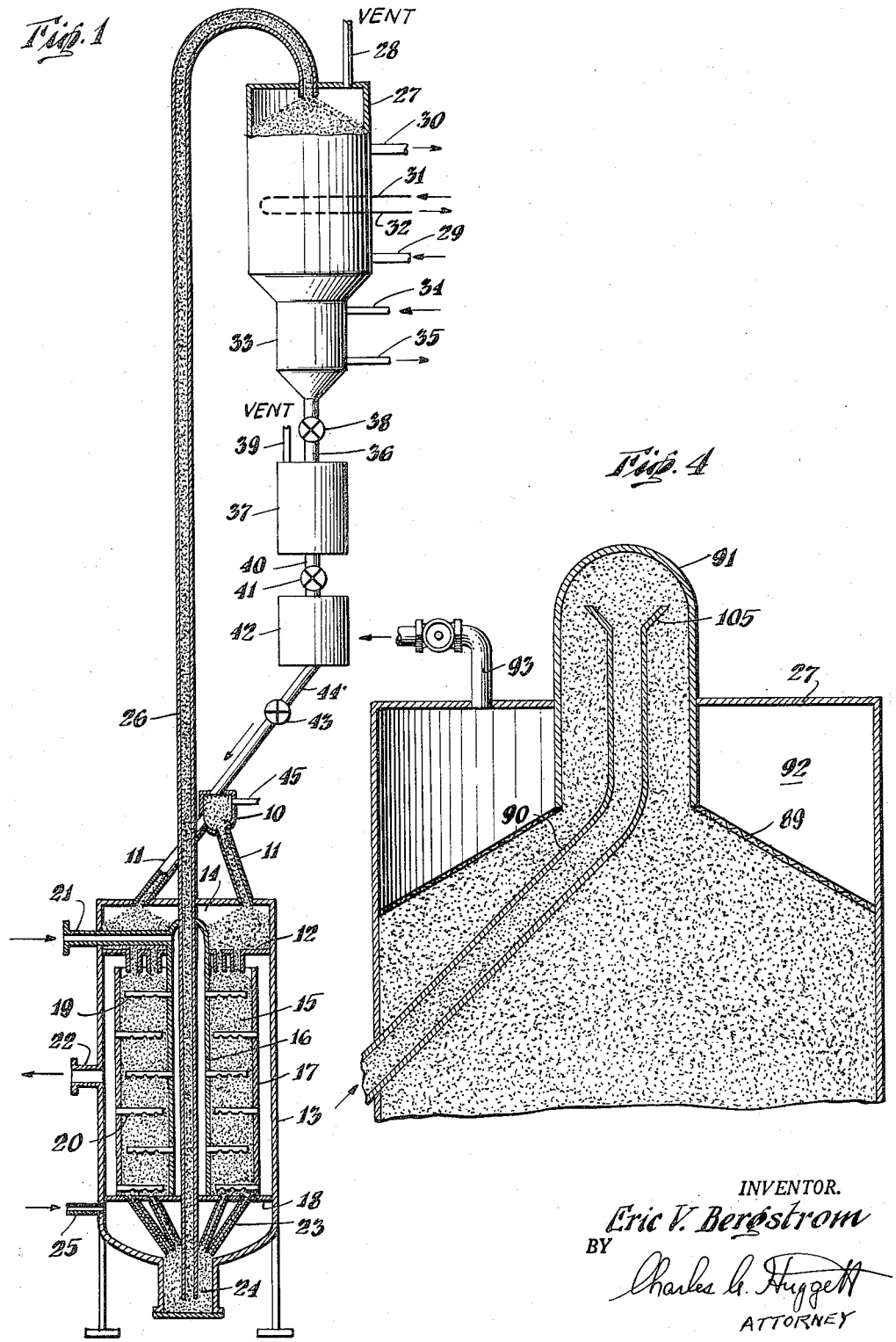

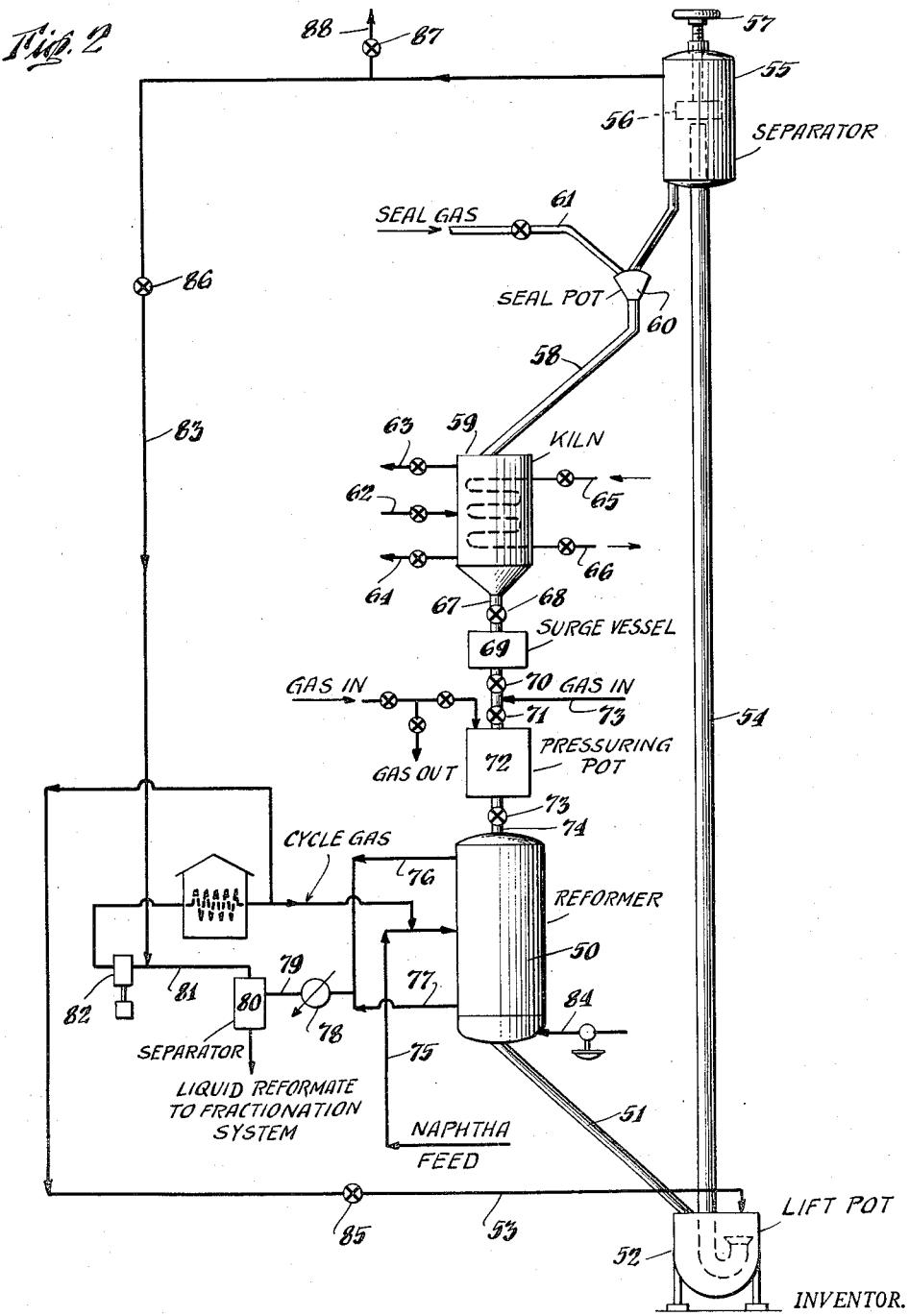

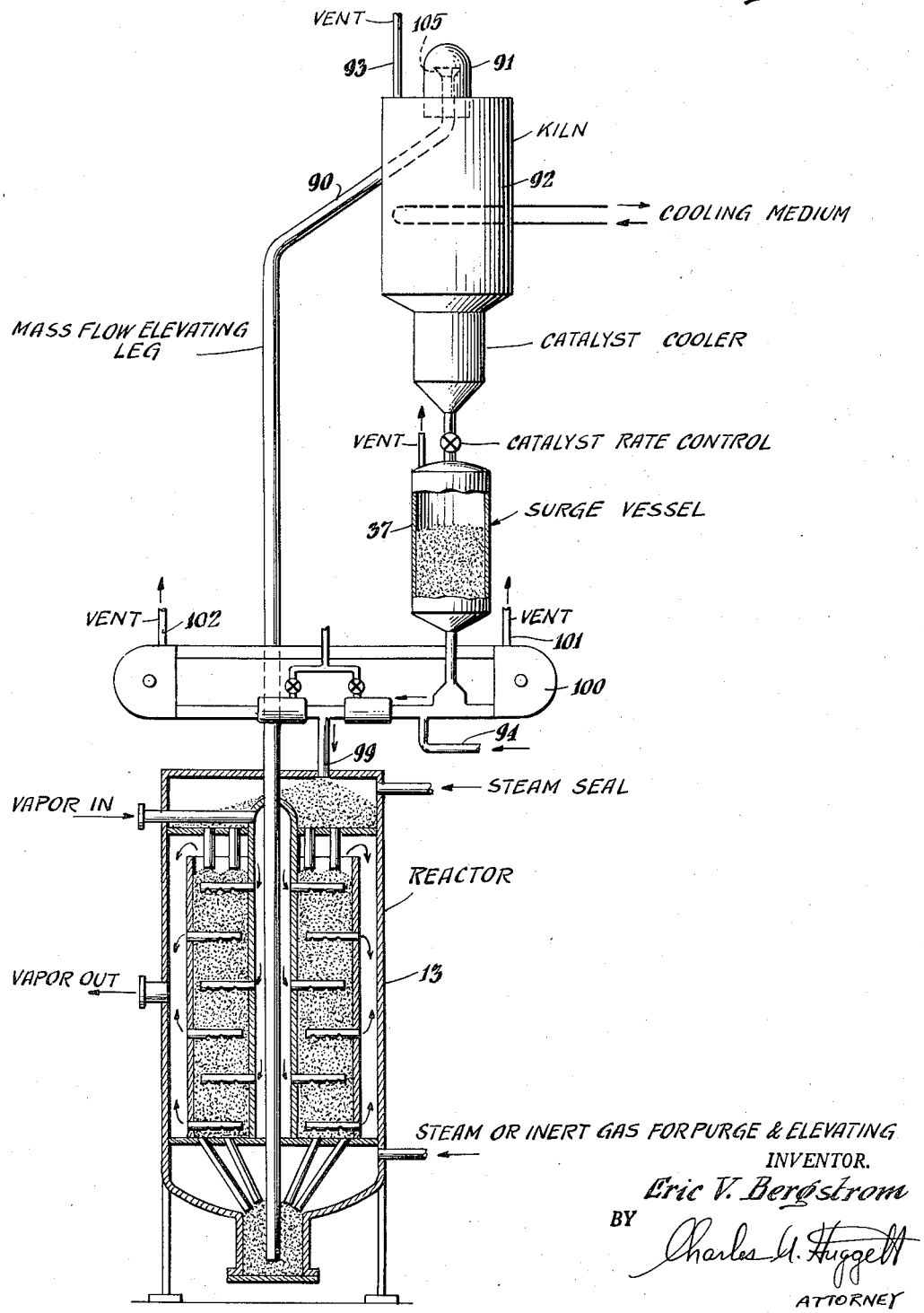

2,854,405

CONTINUOUS HYDROCARBON CONVERSION PROCESS EMPLOYING A COMPACT MASS LIFT

Eric V. Bergstrom, Short Hills, N. J., assignor to Socony Mobil Oil Company, Inc., a corporation of New York Application May 23, 1952, Serial No. 289,647

8 Claims. (Cl. 208—175)

This invention is directed to an improved method and apparatus for conducting continuous contacting of fluids with a moving mass of granular solid contact material in substantially compacted form at pressures which are substantially greater than atmospheric. It is particularly directed to the continuous conversion of hydrocarbons in the presence of a gravitating mass of solids in a reaction zone at high pressure and the withdrawal and transfer of said solids by gas flow to an elevated regeneration zone maintained at low pressure.

The invention may be applied to such processes as catalytic cracking, isomerization, hydrogenation, dehydrogenation, hydroforming, aromatization, alkylation and other contacting processes. Also, the invention may be applied to coking and other pyrolytic conversion processes such as the conversion of propane and ethane to unsaturated hydrocarbons and of methane to acetylene. It finds its most suitable application in processes which require high reaction pressure for the desired conversion reaction, such as is found in reforming processes in which light hydrocarbons which boil in the gasoline boiling range are contacted with a substantially compacted moving mass of solids to effect rearrangement of the molecular structures of the hydrocarbons for improving their suitability as motor fuel.

The contact material involved may vary widely in its properties depending upon its use. For catalytic hydrocarbon conversion systems the catalyst may take the form of natural or treated clays, bauxites, inert or active carriers impregnated with certain catalytically active metals or compounds thereof, or synthetic associations of silica, alumina, magnesia, chromia, molybdenum oxide, etc., or combinations thereof. When the contact material is employed principally for heat carrying purposes as in pyrolytic conversion processes, it may be made from refractory materials such as fused alumina, mullite, carborundum, zirconium oxide, charcoal, etc.; for coking processes the solid material may be a low activity clay catalyst, petroleum coke, pumice or similar material. The contact material may be in the form of pellets, spheres, tablets, pills or irregular shaped material of palpable particulate form as distinguished from powdered material. It should be understood that the term "granular" as employed herein in describing and claiming this invention is intended to broadly cover any of the above forms of contact material. The contact material involved in this invention may range in size from about 0.005 to 0.5 inch and preferably from about 4–20 mesh by Tyler standard screen analysis. The density of the material as poured into a measuring container may be within the range about 20–130 pounds per cubic foot, and in the case of adsorbents preferably within the range about 25–60 pounds per cubic foot.

In continuous reforming systems the contact material is passed cyclically through a conversion zone wherein it contacts a hydrocarbon feed at pressures substantially in advance of atmospheric, such as about 4–20 atmospheres, and temperatures of the order of 700–1100° F., whereby the feed is converted and then through a regeneration zone wherein a carbonaceous contaminant deposited on the catalyst in the conversion zone is removed by burning. When granular catalyst is employed it has been found to be highly desirable to maintain the catalyst as a substantially compact bed or column in the conversion and regeneration zones.

Former reforming operations involved the use of mechanical valves or pressure lock chambers on the catalyst transfer lines, so that the particles could be lifted at substantially atmospheric pressure. As an alternative arrangement, the kiln and reactor were operated at the same pressure. Continuous bucket elevators were used for effecting the elevation of the particles. Mechanical elevators have been found to impose certain practical limitations on the overall unit height of the system.

It is an object of this invention to provide improved method and apparatus for effecting the continuous conversion of hydrocarbons in the presence of a gravitating mass of solids in a high pressure reaction zone and the upward transfer of the solids from the bottom of the reaction zone to the top of a low pressure reconditioning zone.

It is another object of this invention to provide a continuous moving bed conversion process in which solids are removed from the bottom of a high pressure reaction zone and conveyed upwardly to a superposed reconditioning zone maintained at low pressure and in which the flow of solids between the bottom of the reconditioning zone and the top of the reaction zone is controlled to provide a single point control of the flow of solids for the entire process.

It is a further object of this invention to provide improved method and apparatus for passing solids downwardly through a low pressure contacting zone and a high pressure contacting zone in vertical series as a compacted column and for effecting the upward transfer of the solids from the bottom of the high pressure zone to the top of the low-pressure zone without depressuring the solids withdrawn from the high-pressure zone.

It is a further object of this invention to provide a system in which solids are withdrawn from the bottom of a high pressure vessel and transferred upwardly without depressuring to the top of a low pressure vessel which is superposed the high pressure vessel and in which the solids are gravitated downwardly as a continuous column through the two vessel and connecting passageways, the flow of solids through the system being controlled at a single point in the gravitating stream between the upper and lower vessels.

These and other objects will be made more apparent in the following detailed description of the invention, which is to be read in conjunction with the attached sketches which show apparatus arranged for continuous hydrocarbon conversion.

Figure 1 is a vertical elevation, partly in cross-section, of a unitary hydrocarbon conversion system.

Figure 2 is a vertical elevation of an integrated continuous reforming system.

Figure 3 is a vertical elevation of a hydrocarbon conversion system, which incorporates an alternate embodiment of this invention.

Figure 4 is an enlarged elevation, partly in cross-section of the gas-solids separation chamber of Figure 3.

In one of its broadest aspects, this invention involves a continuous cyclic system in which the contact material flows cyclically through a closed path of travel involving two contacting zones, one being at a substantially higher pressure than the other, wherein the contact material flows from the lower section of the higher pressure zone up through a confined passage as a substantially compact stream, in which the particles rest upon each other, under the pressure impetus from the higher pressure zone, or at least under the impetus of a gas at the high pressure zone pressure, to a location from which it may flow down onto a bed of contact material in the lower pressure contacting zone. In addition, the vertical height through which the contact material is required to be conveyed is such that the calculated head of contact material in the vertical portion of the lift passage is less than the pressure differential between the higher and lower pressure zones. The solids in the lift passage, particularly in the upper portion, separate in the gas stream under these conditions, becoming fluidized. This is prevented by the imposition of a restriction on the flow of contact material from the lift passage, whereby the stream of solids within the lift is maintained in compacted condition. By maintaining the particles in the lift passage in compacted form, the best possible seal against excessive gas flow through the lift passage is maintained and also the most uniform, steady flow of solids through the lift is effected.

By vertical head of contact material and similar expressions is meant that head which may be calculated by dividing the total weight of contact material in the vertical part of the column above its lower end by the cross-sectional area of the column. As the gas pressure differential between the two zones is increased from zero, a small amount of gas from the high pressure zone will commence to pass upwardly through the void space between the particles in the compact stream. When the pressure drop in pounds per square inch per unit length of vertical column is just slightly more than the calculated weight of the solid material in that length of column per square inch of its cross-sectional area, the solids will move upwardly through the lift passage. For example, for a material of 40 pounds per cubic foot compact flowing stream density the pressure drop due to gas flow per foot of vertical column height must be more than $$\frac{40 \times 1}{144} = .277$$

pounds per square inch to effect movement of the solids. It will be understood that a compact feed stream creates substantially no hydrostatic head at its lower end of the type created by a vertical standpipe of powdered solids maintained in aerated or fluidized condition. However, in estimating the pressure drop required to lift a column of compacted contact material, it is convenient to express the resistance to flow in terms of a "calculated head." For short streams the calculated head is the quotient of the total weight of contact material in the vertical part of the feed stream above its lower end divided by the horizontal cross-sectional area of the stream. When the pressure drop across the lift passage is just greater than the calculated head, the solids will move upwardly for the most part as a compacted mass. Unless a restriction is placed on the outlet, however, the particles begin to separate in the upper portion of the lift. By restricting the discharge of solids from the upper end of the lift passage this separation of the solids column is prevented, even though the gas pressure across the lift may be substantially in excess of the calculated head, and may be even high enough to effect fluidization of the solids in the lift passage.

Referring now to Figure 1 which shows apparatus adapted for a unitary reforming process, a solid granular contact catalyst is gravitated as a substantially compact mass from the hopper 10 through the connecting legs 11 into the top of the reactor 13. An upper partition plate 12 is located across the vessel in the upper portion thereof, forming a supply chamber 14 above the reaction zone 15. The reaction zone has an annular cross-section formed by inner cylindrical baffle 16 and outer cylindrical baffle 17. The bottom of the reaction zone is formed by the lower partition plate 18. Alternate rows of horizontal feeding 19 and collecting pipes 20 are spaced vertically along the length of the vessel, with the feeding pipes being connected to the inner cylindrical baffle and the collecting pipes being connected to the outer cylindrical baffle. The inner cylindrical baffle is closed at the top and bottom, thereby providing a gas feeding manifold. The manifold is supplied by the conduit 21. The reactant fluids pass from the feeding chamber to the reaction zone through the feeding pipes, and pass upwardly and downwardly through the bed to the nearest collecting pipe. The gas is withdrawn from the bed to the manifold found by the outer cylindrical baffle and the vessel wall. The reaction products are withdrawn from the collecting manifold through the conduit 22. The spent catalyst is withdrawn from the bottom of the reaction zone through the conduits 23 to a feeding chamber 24 in the lower portion of the vessel 13. An inert gas is introduced into the vessel 13 under the lower partition plate 18 via the conduit 25.

The inert gas introduced through the conduit 25 serves the manifold purposes of both a purging and lifting medium. The pressure in the reaction zone may be, for example, about 400 p. s. i. and the temperature about 1000° F. The inert gas is introduced at a pressure slightly higher than that in the reaction zone and this pressure is sufficient to force the catalyst in the feeding zone 24 up the centrally located lift leg 26 in substantially compact columnar form. In a typical reforming process the flow may be about 6 tons of solids per hour and the lift may be about 200 feet high. The top of the lift leg is bent through a semi-circular arc with the end terminated in the top portion of the kiln 27, which is located above the reactor 13. The kiln 27 is vented to substantially atmospheric pressure through the conduit 28. It is seen, therefore, that the solids are not depressurized before being conveyed upwardly. The pressure drop is taken across the lift pipe which performs the function of a depressurizer for the reactor.

The solids pass downwardly through the kiln 27 as a substantially solid column. Combustion supporting gas can be introduced through the conduit 29 to travel upwardly through the column of contact material and burn the contaminants from the surface of the particles. The temperature may suitably be in the neighborhood of 1000° F. for effective burning without heat damage to the solids. The flue gas can be withdrawn through the conduit 30. Since many types of kilns are available, they will not be described in detail. Suitable kilns are shown in United States Patent Numbers 2,458,434 and 2,458,435 or in United States patent application Serial Number 186,954, filed September 27, 1950, now abandoned. A cooling fluid may be introduced through the conduit 31 and withdrawn through the conduit 32 to provide temperature control. Or, if desired, the temperature adjustment may be effected in a separate cooler 33 located outside the vessel 27 by introducing cooling fluid through the conduit 34 and withdrawing it through the conduit 35. The solids are removed from the cooler 33 through the conduit 36 to a surge chamber 37. The rate of flow of the solids through the entire system is controlled by the valve 38 in line 36 so that there is catalyst-free space in the vessel 37 to take the surge. This provides a single point flow control between the reconditioning and reaction zones. The solids are maintained as a substantially compact mass above the valve 38 in the kiln 27. The column of solids in the kiln prevents the particles from being discharged from the lift pipe too rapidly and maintains the particles in the pipe in the form of a rising substantially compact column of particles. The surge chamber is vented to the atmosphere through the conduit 39. The solids are withdrawn from the bottom of the surge chamber 37 through the conduit 40 when the valve 41 is opened to fill the lock vessel 42. When the valve 41 is closed, the valve 43 in conduit 44 is opened to transfer the solids under pressure to the hopper 10. Suitable pressuring and vent lines may be attached to the pressure lock 43 to provide smooth flow to and from the vessel. An inert seal gas may be introduced into the hopper 10 via the conduit 45 at a pressure slightly in advance of that in the reaction zone so that a seal is maintained above the zone.

Figure 2 shows an alternate arrangement of apparatus which illustrates the invention. Solids are withdrawn from the bottom of a high pressure reformer 50 downwardly through a conduit 51 to a lift pot 52 in the form of a substantially compact column. A reaction gas is introduced into the lift pot 52 through the conduit 53 at substantially reaction pressure. The lift leg 54 is terminated at its lower end intermediate the top and bottom of the lift pot 52. The lower end of the leg is bent so as to terminate in an upward direction beneath the surface of the bed of solids in the lift pot. The gas pressure forces the solids into the lift leg and upwardly therethrough to the separator 55. The cap 56 is located above the upper end of the lift leg and is attached to the handle 57 by the shaft 58. By rotating the handle 57, the cap 56 is raised or lowered, thereby providing adjustment of the clearance above the lift pipe, insuring that the flow of solids through the lift is in substantially compact columnar form. The solids flow downwardly through the leg 58 into the kiln 59. A seal gas is introduced into the seal pot 60 through the conduit 61 to prevent hydrocarbon vapors from moving downwardly from the separator 55. A combustion supporting gas is introduced into the kiln 59 through the conduit 62, and withdrawn as flue gas through the conduits 63, 64. A cooling fluid may be introduced into cooling coils in the kiln through conduit 65 and withdrawn through conduit 66.

The reconditioned solids are gravitated from the bottom of the kiln 59 through the conduit 67 at a rate controlled by the setting of the valve 68. The rate is controlled so as to leave a surge space in the vessel 69, and hence the flow through the system is controlled by the valve 68. The catalyst is compacted above the valve 68 to the top of the lift pipe 54, and the catalyst in the lift pipe is thereby maintained in compacted form. Alternatively, the flow of solids through the lift pipe may be controlled by adjustment of the cap 56 so that the bed level in the separator 55 falls below the top of the lift pipe 54. Periodically, the valves 70, 71 are opened, allowing catalyst to feed into the pressurizing pot 72. The valves 70, 71 are then closed and a high pressure inert gas is introduced into the conduit 73. The pressure pot is placed under gas pressure and the valve 73 is opened, allowing the catalyst to drop through the conduit 74 into the reformer 50.

Naphtha is introduced through the conduit 75 into the reformer to travel upwardly and downwardly through the bed of solids in the vessel. The reformate is taken from the top and bottom of the vessel through the conduits 76, 77, cooled in the cooler 78 and introduced via conduit 79 into the separator 80. Liquid reformate is taken from the bottom of the separator to the fractionation system not shown. A cycle gas is taken overhead through the conduit 81 and put under pressure by the pump 82. Part of this gas is re-introduced into the reformer and a second fraction is introduced through conduit 53 into the lift pot 52. The lift gas is removed from the separator 55 through the conduit 83 and introduced into the conduit 81 on the low pressure side of the pump 82.

In a typical operation, the reformer can be operated at about 200 p. s. i. and the separator at about 1 p. s. i. The kiln can be operated conveniently at about 0–1 p. s. i. Because the catalyst is maintained in the lift leg 54 in compacted form, only a small amount of gas flows upwardly through the lift leg. The leg acts as a seal limiting the gas flow. The gas introduced in the lift pot 52 through the conduit 53 may serve both as a lift gas and a purge gas. Alternatively, however, a purge gas may be introduced into the bottom of the reformer 50 through the conduit 84. Or the gas introduced through the conduit 84 may be both a purge gas and a lift gas. In the latter instance, the valves 85 and 86 are closed and the valve 87 in conduit 88 is opened. The lift gas is withdrawn through conduit 88 to waste or discharged into the atmosphere.

Referring now to Figure 3, an alternate embodiment of the invention is shown. The reaction vessel, regeneration vessel and surge vessel are similar to those shown on Figure 1 and the same numbers are used to indicate similar parts. The lift leg 90 is terminated in a dome 91 located in the roof of the kiln 27 and the leg, instead of being bent at the upper end, is directed upwardly in the center of the dome. An enlarged detail of the upper section of the kiln 27 is shown on Figure 4. The horizontal cross-section of the dome 91 is substantially smaller than the cross-section of the vessel 27, and the dome is projected downwardly at its lower end into the vessel 27 for a considerable distance. This provides a gas disengaging space 92 at the upper end of the vessel. The gas is withdrawn through the conduit 93. The dome-shaped member 91 is usually operated full of contact material in substantially compacted form, the pressure drop across the lift leg being more than sufficient to raise the catalyst in the lift leg as a compact column. The flow rate of the solids is controlled by the catalyst control valve 38 in the line 36 at the bottom of the kiln. In those instances where the pressure drop across the lift leg is marginal, the solids level may drop below the top of the dome-shaped member to a level at or just above the top of the lift leg 90. The surge vessel 37 feeds directly into a continuous conveyor 100 designed with suitable seals for feeding directly into a vessel maintained at high pressure. Seal steam may be introduced through conduits 94, 95 at substantially 0 p. s. i. and through conduit 96 between the seals 97, 98 at approximately 400 p. s. i. The seal steam is withdrawn from the ends of the conveyor through the conduits 101, 102. The solids are dropped through the conduit 99 into the reactor 13, maintained at about 400 p. s. i. The reactor may be maintained at about 1000° F. and the kiln at about 1000° F. in a typical reforming process. A suitable solids flow for such a process may be about 6 tons of catalyst per hour. The temperature of the solids in the surge vessel may suitably be about 300–500° F.

In the preferred form of the invention, the solids are discharged into the dome 90 as shown on Figure 4, from a level just below the top of the dome and through an enlarged discharge member 105 at the upper end of the lift leg. The member 105 provides more room for gas separation at the point of its discharge from the lift. The gas passes downwardly in the dome 91 and into the catalyst bed in the receiving vessel before separating from the solids at the top of the receiving vessel. This may be a kiln, a regenerator or a hopper located at the top of the lift leg. The cross-section of the vessel must be large enough in relation to that of the dome-shaped member to provide a gas disengaging area great enough to prevent boiling of the catalyst at the discharging surface. Boiling can also be avoided by locating a suitably sized screen 89 at the surface of the catalyst bed. Although the invention finds ready application in reforming process where the pressure differential between the reformer and kiln is great, it may also be applied to other processes, such as cracking where there is a sufficient differential in pressure between the reactor and kiln to provide suitable mass flow lifting.

This invention is not intended to be limited to the specific embodiments shown above, being broad in its application and intended to cover all changes and modifications of the examples of the invention herein chosen for purposes of disclosure, which do not constitute departures from the spirit and scope of the invention.

I claim:

1. In a conversion system wherein a granular contact material is caused to move through an enclosed cyclic path including a high pressure contacting zone and a lower pressure contacting zone having its point of contact material entry at an elevation substantially above the point of contact material exit from the higher pressure zone and wherein the contact material moves downwardly through at least a portion of each of said zones as a compact bed and wherein the pressure differential between said zones is greater than the value of the calculated head of a compact column of said contact material equal in height to the elevation differential between said points of entry and exit, the method for effecting continuous transfer of the contact material from the higher pressure zone to the zone of lower pressure which comprises: permitting the contact material to be forced upwardly as a confined unobstructed compact lift stream extending from the lower section of said higher pressure zone to a location from which it may flow by gravity onto the bed in said low pressure zone by the gaseous pressure differential between said zones, whereby the gaseous pressure on the contact material is gradually reduced during its transfer and imposing a restriction to the flow of contact material issuing from said confined lift stream to maintain the material in compacted condition within said stream.

2. In a conversion system wherein a granular contact material is caused to move through an enclosed cyclic path including a high pressure contacting zone and a lower pressure contacting zone having its point of contact material entry at an elevation substantially above the point of contact material exit from the higher pressure zone and wherein the contact material moves downwardly through at least a portion of each of said zones as a compact bed, the method for effecting continuous transfer of the contact material from the higher pressure zone to the zone of lower pressure which comprises: maintaining the pressure in the higher pressure zone above that in the lower pressure zone by an amount at least greater than the value of the calculated head of a compact column of said contact material equal in height to the elevation differential between said points of entry and exit, allowing the contact material to be forced upwardly as a confined unobstructed compact lift stream extending from the lower section of said higher pressure zone to a location from which it may flow by gravity onto the bed in said low pressure zone by the gaseous pressure differential between said zones, whereby the gaseous pressure on the contact material is gradually reduced during its transfer and imposing a restriction to the flow of contact material issuing from said confined lift stream to maintain the material in compacted condition within said stream.

3. In a reforming system in which a granular contact material is caused to move through an enclosed cyclic path including a reforming zone and a reconditioning zone having its point of contact material entry at an elevation substantially above the point of contact material exit from the reforming zone and wherein the contact material moves downwardly through at least a portion of each of said zones as a compact bed and wherein the reforming operations are conducted at a pressure above that in the reconditioning zone by an amount at least greater than the value of the calculated head of a compact column of said contact material equal in height to the elevation differential between said points of entry and exit, the method for effecting continuous transfer of the contact material from the reforming zone to the reconditioning zone which comprises: permitting the contact material to be forced upwardly through at least one laterally confined unobstructed passage by the gas pressure differential between the two zones, the passage extending upwardly from the lower section of the reforming zone to a location from which it may flow by gravity onto the bed of contact material in the reconditioning zone, and restricting the flow of contact material in the column in substantially compacted form, whereby the gaseous pressure on the contact material is gradually reduced during its transfer through the passage.

4. In a hydrocarbon conversion process in which a granular contact material is gravitated as a substantially compact mass through reaction and reconditioning zones, one of the zones being maintained at a substantially higher pressure than the other of said zones, the improvement which comprises: withdrawing granular material downwardly from the higher pressure zone to a feeding zone as a continuously flowing substantially compact unobstructed column, introducing an inert gas into said feeding zone, so as to maintain the pressure in said zone approximately equal to that in the high pressure zone, transferring the granular material upwardly from said feeding zone through a laterally confined passage to a receiving zone in the form of substantially compact column, withdrawing gas from said receiving zone, so as to maintain the pressure in said receiving zone approximately equal to the pressure in said low pressure zone, gravitating the granular material downwardly from said receiving zone through said low pressure zone as a substantially compact gravitating mass, withdrawing granular material from the lower portion of said low pressure zone, introducing the granular material withdrawn from the low pressure zone into the top of the high pressure zone, and controlling the rate at which granular material is withdrawn from said low pressure zone, whereby the rate at which the granular material is circulated through an enclosed cyclic path is controlled.

5. In a hydrocarbon conversion process in which a granular contact material is gravitated as a substantially compact mass through reaction and reconditioning zones located one above the other, the lower zone being maintained at a substantially higher pressure than the upper zone, the improvement which comprises: withdrawing granular material downwardly from the high pressure zone to a feeding zone as a continuously flowing substantially compact unobstructed column, introducing an inert gas into said feeding zone, so as to maintain the pressure in said zone approximately equal to that in the high pressure zone, transferring the granular material upwardly from said feeding zone to a receiving zone located above the upper zone and depressuring the gas pressure upon the granular material to approximately the pressure in the low pressure zone, withdrawing gas from the receiving zone, so as to maintain the pressure in said zone approximately the same as the pressure in said upper zone, gravitating the granular material downwardly from the receiving zone through the low pressure zone in the form of a substantially compacted mass of particles, withdrawing granular material from the low pressure zone as a substantially compacted column, controlling the flow rate at which the granular material is withdrawn from said low pressure zone, so as to control the total cyclic circulation of the granular material, increasing the gas pressure on the granular material to approximately the same pressure as that in the high pressure zone and introducing the granular material into the top of the high pressure zone.

6. In a hydrocarbon conversion process in which a granular contact material is gravitated as a substantially compact mass through reaction and reconditioning zones located one above the other, the lower zone being maintained at a substantially higher pressure than the upper zone, the improvement which comprises: withdrawing granular material downwardly from the high pressure zone to a feeding zone as a continuously flowing substantially compact unobstructive column, introducing an inert gas into said feeding zone at an advanced pressure, so as to maintain the pressure in said zone approximately equal to that in the high pressure zone and drive the granular material upwardly through a laterally confined passage to a receiving zone located above the low pressure zone, withdrawing gas from the receiving zone at a rate sufficient to maintain the pressure in said zone approximately the same as that in the low pressure zone, whereby the pressure drop between the two zones is taken across a rising substantially compact column of granular material in the lift passage, gravitating the granular material downwardly from the receiving zone through the low pressure zone in the form of a continuous unobstructed substantially compacted mass of particles which extends from the top of the lift passage to the bottom of the low pressure zone, withdrawing granular material from the bottom of the low pressure zone and controlling the flow rate at which the granular material is withdrawn from said zone, whereby the circulation rate of the granular material in the conversion process is effectively controlled.

7. In a hydrocarbon conversion process in which a granular contact material is gravitated as a substantially compact mass through reaction and reconditioning zones located one above the other, the lower zone being maintained at a substantially higher pressure than the upper zone, the improvement which comprises: withdrawing granular material downwardly from the high pressure zone to a feeding zone as a continuously flowing substantially compact unobstructed column, introducing an inert gas into said feeding zone at an advanced pressure, so as to maintain the pressure in said zone approximately equal to that in the high pressure zone and drive the granular material upwardly through a laterally confined passage into a partially enclosed region about the upper end of the passage, gravitating the contact material downwardly in said region to a level below the upper end of the passage as a substantially compact column of restricted cross-section, introducing the contact material onto the top of a gravitating bed of contact material in a receiving zone of enlarged cross-section, at a level below the top of said zone, withdrawing gas from said receiving zone at a level above the top of the gravitating bed of contact material, so as to take substantially the entire pressure drop from the high pressure zone across the lift passage, withdrawing contact material downwardly from the bottom of the receiving zone as a continuous unobstructed column of contact material, and controlling the flow rate of the contact material at the bottom of the column, so as to control the circulation rate of the contact material in the entire conversion system.

8. In a continuous reforming process wherein a granular catalyst is passed downwardly in series through a supply zone and a regeneration zone maintained at substantially atmospheric pressure and then through a reforming zone therebelow maintained at a higher pressure, the method for transferring the catalyst continuously from the lower end of said reforming zone to said supply zone thereabove which comprises: maintaining a confined lift column of catalyst extending upwardly from a location below and openly communicating with the lower end of said reforming zone to a location within said supply zone, introducing an inert seal gas into the lower section of said reforming zone to prevent entry of hydrocarbon vapors into said lift column, maintaining the pressure of the gaseous hydrocarbons and said inert gas in said reforming zone above the pressure in said supply zone by an amount substantially in excess of the calculated head of catalyst in the vertical portion of said lift column, whereby the catalyst is caused to flow upwardly from the reforming zone through said lift column into said separation zone by said inert gas while the entire pressure differential between the reforming zone and said supply zone is reduced across said lift column so as to tend to cause the column to lose its compacted condition and imposing a restriction on the flow of catalyst from the upper end of said confined column sufficient to maintain the catalyst in compacted condition throughout said lift column.

References Cited in the file of this patent
UNITED STATES PATENTS

| Number | Name | Date |
| --- | --- | --- |
| 2,407,700 | Huff | Sept. 17, 1946 |
| 2,412,152 | Huff | Dec. 3, 1946 |
| 2,546,625 | Bergstrom | Mar. 27, 1951 |
| 2,548,286 | Bergstrom | Apr. 10, 1951 |
| 2,624,695 | Ivey et al. | Jan. 6, 1953 |
| 2,676,142 | Crowley | Apr. 20, 1954 |
| 2,684,867 | Berg | July 27, 1954 |
| 2,684,930 | Berg | July 27, 1954 |

Notice of Adverse Decision in Interference

In Interference No. 91,890 involving Patent No. 2,854,405, E. V. Bergstrom, CONTINUOUS HYDROCARBON CONVERSION PROCESS EMPLOYING A COMPACT MASS LIFT, final judgment adverse to the patentee was rendered July 20, 1965, as to claims 3 and 7.

[*Official Gazette December 14, 1965.*]